(12) United States Patent
Huijs et al.

(10) Patent No.: US 11,014,173 B2
(45) Date of Patent: May 25, 2021

(54) ROTARY CUTTING TOOL

(71) Applicant: SECO TOOLS AB, Fagersta (SE)

(72) Inventors: Jeroen Huijs, Grubbenvorst (NL);
Hans Hermans, Grubbenvorst (NL)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 16/478,113

(22) PCT Filed: Dec. 5, 2017

(86) PCT No.: PCT/EP2017/081474
§ 371 (c)(1),
(2) Date: Jul. 15, 2019

(87) PCT Pub. No.: WO2018/130342
PCT Pub. Date: Jul. 19, 2018

(65) Prior Publication Data
US 2019/0366453 A1    Dec. 5, 2019

(30) Foreign Application Priority Data

Jan. 16, 2017  (EP) .................................... 17151621

(51) Int. Cl.
*B23C 5/10*  (2006.01)
(52) U.S. Cl.
CPC ........ *B23C 5/10* (2013.01); *B23C 2210/0492* (2013.01); *B23C 2210/405* (2013.01); *B23C 2210/407* (2013.01); *B23C 2226/27* (2013.01)

(58) Field of Classification Search
CPC .............. B23C 5/10; B23C 2210/0492; B23C 2210/241; B23C 2210/287;
(Continued)

(56) References Cited

U.S. PATENT DOCUMENTS 3,058,199 A * 10/1962 Cave .......................... B23C 5/10
407/54
4,285,618 A * 8/1981 Shanley, Jr. .............. B23C 5/10
407/54
(Continued)

FOREIGN PATENT DOCUMENTS

CN         101623778 A      1/2010
DE      102009015262 A1    10/2009
(Continued)

*Primary Examiner* — Ryan C Rufo
(74) *Attorney, Agent, or Firm* — Corinne R. Gorski

(57) ABSTRACT

The rotatable cutting tool includes a cutting portion extending from the front end and a mounting portion extending from the rear end. The cutting portion includes a front end face surface and a peripheral surface extending from the front end face surface towards the mounting portion. The peripheral surface includes first helical flutes extending from the front end to a first helical flute rear end and second helical flutes extending from a second helical flute front end to a second helical flute rear end. The first helical flutes are helically aligned about the longitudinal axis and form a first helix angle. The second helical flutes are helically aligned about the longitudinal axis and form a second helix angle. The first helix angle decreases in absolute value away from the front end and/or that the second helix angle increases in absolute value away from the front end.

22 Claims, 5 Drawing Sheets

(58) Field of Classification Search
CPC ........ B23C 2210/326; B23C 2210/402; B23C 2210/405; B23C 2210/407; B23C 2226/27
See application file for complete search history.

(56) References Cited

U.S. PATENT DOCUMENTS

| | | | | |
|---|---|---|---|---|
| 4,395,167 A | * | 7/1983 | Maternus | B23B 51/08 407/54 |
| 4,810,136 A | * | 3/1989 | Paige | B23C 5/10 407/54 |
| 4,990,035 A | | 2/1991 | Scheuch et al. | |
| 5,193,944 A | * | 3/1993 | Nishimura | B23C 5/1081 407/119 |
| 5,221,163 A | * | 6/1993 | Nishimura | B23C 5/10 407/53 |
| 5,626,444 A | * | 5/1997 | Campian | B23C 3/00 407/54 |
| 6,164,876 A | * | 12/2000 | Cordovano | B23C 5/10 407/59 |
| 6,234,725 B1 | * | 5/2001 | Campian | B23C 5/1009 407/54 |
| 9,232,953 B2 | * | 1/2016 | Bono | A61B 17/1615 |
| 2005/0105973 A1 | * | 5/2005 | MacArthur | B23C 5/10 407/53 |
| 2005/0123363 A1 | | 6/2005 | Ahrnkiel et al. | |
| 2009/0136308 A1 | * | 5/2009 | Newitt | B23C 5/10 408/145 |
| 2012/0107061 A1 | * | 5/2012 | Harif | B23C 5/165 407/61 |
| 2013/0136548 A1 | * | 5/2013 | Takahashi | B23C 5/165 407/54 |
| 2013/0259585 A1 | * | 10/2013 | Xu | B23C 5/10 407/54 |
| 2013/0294852 A1 | * | 11/2013 | Winebrenner | A61K 31/573 407/54 |
| 2015/0050095 A1 | * | 2/2015 | Krenzer | B23C 5/10 409/132 |
| 2015/0093204 A1 | * | 4/2015 | Raynor | B23C 5/10 407/32 |
| 2015/0147127 A1 | * | 5/2015 | Shpigelman | B23C 5/10 407/54 |
| 2017/0120349 A1 | * | 5/2017 | Haimer | B23C 5/10 |
| 2017/0216936 A1 | * | 8/2017 | Dodds | B23C 5/10 |
| 2018/0326509 A1 | * | 11/2018 | Woermann | B23C 5/10 |

FOREIGN PATENT DOCUMENTS

| | | | |
|---|---|---|---|
| DE | 202015106056 U1 | 11/2015 | |
| EP | 3192604 B1 * | 6/2018 | ............... B23C 5/10 |
| FR | 2972122 A1 * | 9/2012 | ............... B23C 5/10 |
| JP | 2601803 B2 * | 4/1997 | ............... B23C 5/10 |
| WO | WO-2016020047 A1 * | 2/2016 | ............... B23C 5/10 |

* cited by examiner

ROTARY CUTTING TOOL

RELATED APPLICATION DATA

This application is a § 371 National Stage Application of PCT International Application No. PCT/EP2017/081474 filed Dec. 5, 2017 claiming priority to EP 17151621.4 filed Jan. 16, 2017.

TECHNICAL FIELD OF THE INVENTION

The present invention belongs to the technical field of cutting tools. More specifically the present invention belongs to the field of rotary cutting tools, e.g. milling tools or end mill cutters, for machining of fiber reinforced polymer work piece materials. Such cutting tools can be used e.g. for machining components for the aviation industry, such as components for aircrafts. Such machining can be made using computer or computerized numerical control, i.e. CNC, machines.

BACKGROUND OF THE INVENTION AND PRIOR ART

The present invention refers to a rotatable cutting tool according to the preamble of claim 1. In other words, the present invention refers to a rotatable cutting tool having a longitudinal axis about which the rotary cutting tool is rotatable in a direction of rotation, the rotatable cutting tool comprising: a front end and an opposite rear end, the front end comprising a front end face surface; a cutting portion extending from the front end and a mounting portion extending from the rear end, the cutting portion comprising the front end face surface, intersected by the longitudinal axis, and a peripheral surface extending from the front end face surface towards the mounting portion, the peripheral surface comprising: first helical flutes extending from the front end to a first helical flute rear end, second helical flutes extending from a second helical flute front end to a second helical flute rear end, at least one of the second helical flutes intersects with at least one of the first helical flutes at a portion located between the first helical flute rear end and the second helical flute front end; the second helical flute front end, the first helical flute rear end, and the second helical flute rear end each is at an axial distance greater than zero from the front end, wherein first helical cutting edges are formed between adjacent pairs of first helical flutes;

wherein second helical cutting edges are formed between adjacent pairs of second helical flutes; wherein third cutting edges are formed between adjacent pairs of first helical flutes and adjacent pairs of second helical flutes; wherein the first helical flutes and the second helical flutes being of opposite hands, wherein the first helical flutes are helically aligned about the longitudinal axis and forming a first helix angle; wherein the second helical flutes are helically aligned about the longitudinal axis and forming a second helix angle; wherein a first core diameter is defined by a diameter the first helical flutes; wherein a second core diameter is defined by the second helical flutes.

In cutting of composite materials, it is common to use milling cutters having peripheral cutting edges which are used to for the work piece into a desired shape. Such milling cutters can be made from cemented carbide. US2013294852 discloses one cutter having first and second helical flutes of opposite hands. Said cutter is said to avoid fiber pull out of fiber reinforced composite materials.

The inventors have found that there is a need for a further improved cutting tool in order to further improve the cutting performance, especially when machining sandwich shaped fiber reinforced polymers.

SUMMARY OF THE INVENTION

An object of the present invention is to provide a cutting tool which when cutting a sandwich structured work piece having a honeycomb structured core comprising carbon fiber reinforced polymer (CFRP), glass fiber reinforced polymer (GFRP), aramid fiber reinforced polymer (AFRP) or paper honeycomb, using the peripheral surface of the cutting portion, reduce the delamination and/or amount of uncut fibers between the work piece and the top and/or bottom surface of the work piece.

In particular, the work piece to be cut preferably comprises a AFRP honeycomb shaped core and top and bottom layers made from AFRP.

This object is achieved with the initially defined cutting tool which is characterized in that the first helix angle is decreasing in absolute value away from the front end and/or that the second helix angle is increasing in absolute value away from the front end.

The rotatable cutting tool is preferably a milling cutter or a router, and is preferably made from a material comprising cemented carbide.

The rotatable cutting tool is preferably substantially symmetrical around the longitudinal axis.

The cutting operation is preferably milling, e.g. edge milling or contouring. The clamping portion is suitable to be connected, directly or indirectly, to a machine tool spindle, such that the rear end is facing the machine tool spindle. The clamping portion can be substantially cylindrical, suitable for being clamped by a chuck. Alternatively, the clamping portion may comprise connecting or locking means, such as one or more internal or external threads, for suitable connection to an intermediate rotatable tool part.

The front end face surface preferably comprises one or more cutting edges extending from the longitudinal axis to the peripheral surface, preferably in a plane perpendicular to the longitudinal axis.

The cutting portion is suitable for cutting a work piece made from a fiber material, such as preferably carbon fiber reinforced polymer, glass fiber reinforced polymer or aramid fiber reinforced polymer. The work piece material preferably is a sandwich-structured, where the core is preferably an aramid fiber material having a honeycomb structure or shape.

The peripheral surface is an external surface. The peripheral surface of the cutting portion has a longitudinal extension which is defined by the joint or combined longitudinal extension of the first and second helical flutes.

The peripheral surface comprises a plurality of first helical flutes, or grooves, or elongated concavities, or elongated depressions. The axis of the first helical flutes is the longitudinal axis of the cutting tool.

The first helical flutes differ by a translation along the axis. The first helical flutes are preferably evenly or substantially evenly distributed about the longitudinal axis. In other words, in a cross section perpendicular to the longitudinal axis, adjacent pairs of first helical flutes form a constant or substantially constant angle relative to each other.

The first helical flutes are preferably congruent.

The first helical flutes extend longitudinally over only a portion of the peripheral surface of cutting portion. In other words, the longitudinal extension of the first helical flutes is less than 100%, preferably 20-80%, even more preferably 55-70%, of the longitudinal extension of the peripheral surface of the cutting portion.

The first helical flutes extend longitudinally from the front end of the cutting tool to a first helical flute rear end.

The first helical flute rear end is between and longitudinally spaced apart from a rear end of the peripheral surface of the cutting portion.

The peripheral surface comprises a plurality of second helical flutes, or grooves, or elongated concavities, or elongated depressions. The axis of the second helical flutes is the longitudinal axis of the cutting tool.

The second helical flutes differ by a translation along the axis. The second helical flutes are preferably evenly or substantially evenly distributed about the longitudinal axis. In other words, in a cross section perpendicular to the longitudinal axis, adjacent pairs of second helical flutes form a constant or substantially constant angle relative to each other.

The second helical flutes are preferably congruent.

The second helical flutes extend longitudinally over only a portion of the peripheral surface of cutting portion. In other words, the longitudinal extension of the second helical flutes is less than 100%, preferably 30-99%, even more preferably 95-70%, of the longitudinal extension of the peripheral surface of the cutting portion.

The second helical flutes extend longitudinally from a second helical flute front end, spaced apart from the front end, to a second helical flute rear end.

The second helical flute rear end coincides longitudinally with the rear end of the peripheral surface of the cutting portion.

At least one, preferably all, of the second helical flutes intersects with at least one, preferably all, of the first helical flutes at a portion located between the first helical flute rear end and the second helical flute front end. In other words, the above intersections are between and spaced apart from both the rear end of the peripheral surface of the cutting portion and the front end of the cutting tool.

Preferably, the above intersections together form a waffle-like pattern, when the cutting tool is seen in a side view.

The second helical flute front end, the first helical flute rear end, and the second helical flute rear end are each longitudinally spaced apart from each other, and are placed at an increasing axial distance greater than zero from the front end. In other words, in relation to the front end, the second helical flute front end is closest and the second helical flute rear end is the furthest. Thus, the first helical flute rear end is longitudinally between the second helical flute front end and the second helical flute rear end.

First helical cutting edges are formed between adjacent pairs of first helical flutes. Each of the first helical cutting edges preferably extend uninterrupted longitudinally between the front end and the second helical flute front end. The axis of the first helical cutting edges is the longitudinal axis of the cutting tool. The first helical cutting edges are preferably in the forms of cylindrical helixes.

The first helical cutting edges differ by a translation along the axis. The first helical cutting edges are preferably evenly or substantially evenly distributed about the longitudinal axis. In other words, in a cross section perpendicular to the longitudinal axis, adjacent pairs of first helical cutting edges form a constant or substantially constant angle relative to each other.

The first helical cutting edges are preferably congruent.

The first helical cutting edges extend longitudinally over only a portion, i.e. less than 100%, of the peripheral surface of cutting portion.

Second helical cutting edges are formed between adjacent pairs of second helical flutes. Each of the second helical cutting edges preferably extend uninterrupted longitudinally between the first helical flute rear end and the second helical flute rear end.

The axis of the second helical cutting edges is the longitudinal axis of the cutting tool. The second helical cutting edges are preferably in the forms of cylindrical helixes.

The second helical cutting edges differ by a translation along the axis. The second helical cutting edges are preferably evenly or substantially evenly distributed about the longitudinal axis. In other words, in a cross section perpendicular to the longitudinal axis, adjacent pairs of second helical cutting edges form a constant or substantially constant angle relative to each other.

The second helical cutting edges are preferably congruent.

The second helical cutting edges extend longitudinally over only a portion, i.e. less than 100%, of the peripheral surface of cutting portion.

Third cutting edges, or cutting teeth, are formed or positioned between adjacent pairs of first helical flutes and adjacent pairs of second helical flutes. Each of the third cutting edges are preferably in the form of an apex, or an uppermost point in relation to the longitudinal axis, of a protrusion, wherein the base of said protrusion is limited or defined by adjacent pairs of first helical flutes and adjacent pairs of second helical flutes. Said adjacent pairs of first helical flutes are thus intersecting said adjacent pairs of second helical flutes. Said protrusion is preferably pyramid shaped, wherein the third cutting edge is the apex of said pyramid. Said apex is facing away from the longitudinal axis of the cutting tool. Alternatively, said protrusion may be shark-teeth shaped. Alternatively, said protrusion may be in the form of a truncated pyramid or a truncated shark-teeth shaped protrusion, such that the third cutting edges is in the form of at least a portion of the top surface or the top surface boundary lines of said truncated pyramid or said shark-teeth shaped protrusion.

The third cutting edges are located or positioned longitudinally between, i preferably at least longitudinally mid-way between or substantially mid-way between, the first helical flute rear end and the second helical flute front end.

All third cutting edges are preferably located at a constant radial distance relative to the longitudinal axis of the cutting tool.

The third cutting edges are preferably evenly or substantially evenly distributed about the longitudinal axis. In other words, in a cross section perpendicular to the longitudinal axis, adjacent pairs of third cutting edges form a constant or substantially constant angle relative to each other.

The number of third cutting edges is preferably greater than 10, even more preferably greater than 40. The number of third cutting edges is preferably less than 5000.

The first helical flutes and the second helical flutes are of opposite hands. Thus, as a first alternative, the first helical flutes are right-handed and the second helical flutes are left-handed. As a second alternative, the first helical flutes are left-handed and the second helical flutes are right-handed.

Correspondingly, the first helical cutting edges and the second helical cutting edges are of opposite hands.

The first helical flutes are helically aligned about the longitudinal axis and forms a first helix angle, where the first helix angle is the angle which the first helical flutes form in relation to a plane comprising the longitudinal axis of the cutting tool and which plane intersects the first helical flutes.

The second helical flutes are helically aligned about the longitudinal axis and forms a second helix angle, where the second helix angle is the angle which the second helical flutes form in relation to a plane comprising the longitudinal axis of the cutting tool and which plane intersects the second helical flutes.

A first core diameter is defined by a diameter the first helical flutes. In other words, the first core diameter is defined as the distance between opposite first helical flutes measured in a plane perpendicular to the longitudinal axis of the cutting tool.

A second core diameter is defined by a diameter the second helical flutes. In other words, the second core diameter is defined as the distance between opposite second helical flutes measured in a plane perpendicular to the longitudinal axis of the cutting tool.

The first helix angle is decreasing in absolute value away from the front end and/or that the second helix angle is increasing in absolute value away from the front end. In other words, the pitch of the first helical flutes is increasing away from the front end and/or the pitch of the second helical flutes is decreasing away from the front end. The variation of said helix angle/angles, or pitch/pitches, is/are preferably continuous, gradual, or smooth, without any steps. Said variation or variations is preferably at a constant rate.

According to an embodiment of the invention, the first core diameter is increasing away from the front end.

By such a cutting tool, the risk of delamination and/or amount of uncut fibers on the top or bottom of the work piece is further reduced.

The first core diameter is increasing away from the front end, thus the first helical flutes are in the form of conic, and not cylindrical, helixes, or as spirals on a conic surface, where the apex of the cone is ahead or forward, in the longitudinal direction, of the front end of the cutting tool. The axis of the cone coincides with the longitudinal axis of the cutting tool.

According to an embodiment of the invention, the second core diameter is increasing away from the front end.

By such a cutting tool, the risk of delamination and/or amount of uncut fibers on the top or bottom of the work piece is further reduced.

The second core diameter is increasing away from the front end, thus the first helical flutes are in the form of conic, and not cylindrical, helixes, or as spirals on a conic surface, where the apex of the cone is behind or rearward, in the longitudinal direction, of the front end of the cutting tool.

The axis of the cone coincides with the longitudinal axis of the cutting tool.

Preferably, the first and second core diameter, respectively, increases in opposite longitudinal directions. By such a cutting tool, where the first and second core diameter, respectively, varies in opposite longitudinal directions, the third cutting teeth have a more shark teeth-like shape, thereby improving the surface quality of the cut honeycomb structure material.

According to an embodiment of the invention, the third cutting edges comprise cutting edges formed as apexes of pyramid protrusions.

By such a cutting tool, the machined surface, especially the surface finish, is further improved, when the machined surface is an aramid fiber honeycomb structured core which is machined by the third cutting edges. Preferably the pyramid protrusions have right angle or substantially right angle bases. Said apexes may be sharp, i.e. in the form of a singular point. Alternatively, said apexes may have a shape which is substantially similar to such shape, e.g. an apex shape in the form of a square or a rectangle having all sides less than 1.0 mm.

According to an embodiment of the invention, an axial distance between the first helical flute rear end and the second helical flute front end is greater than an axial distance between the front end and the second helical flute front end, wherein said axial distance between the first helical flute rear end and the second helical flute front end is greater than an axial distance between the first helical flute rear end and the second helical flute rear end.

The peripheral portion of the cutting portion thus comprises three sub-portions: a first sub portion longitudinally between the front end and the second helical flute front end, comprising only first helical flutes, i.e. not comprising second helical flutes; a second sub portion longitudinally between the first helical flute rear end and the second helical flute rear end, comprising only second helical flutes, i.e. not comprising first helical flutes; and a third sub portion longitudinally between the first and the second sub portions comprising first and second helical flutes. The third sub portion comprises intersections of first and second helical flutes. Said third sub portion, which is longitudinally longer than said first and second sub portions, is suitable for cutting an aramid fiber honeycomb shaped core of a sandwich structure. Such cutting tool, having a relatively longitudinally longer third sub portion, gives a cleaner cut of said honeycomb structure, and is particularly advantageous when cutting a sandwich structure having a honeycomb-shaped core having a width which is greater than each of the top and bottom layers of the sandwich structure. In other words, by such a cutting tool, machining of a sandwich structured composite having a honeycomb core made from aramid fiber is improved, when the thickness of the honeycomb core is greater than the top layer and the bottom layer of the sandwich structure.

According to an embodiment of the invention, the first helix angle in absolute value varies within the range of 40°-70°, preferably 50°-60°.

By such a cutting tool, any delamination between honeycomb structure and top or bottom layer is even further reduced. By such a cutting tool, a compression effect is created which reduces the chance of getting uncut fibers.

According to an embodiment of the invention, the second helix angle in absolute value varies within the range of 40°-70°, preferably 50°-60°.

By such a cutting tool, any delamination between honeycomb structure and top or bottom layer is even further reduced. By such a cutting tool, a compression effect is created which reduces the chance of getting uncut fibers.

According to an embodiment of the invention, each of the first and second helical cutting edges are positioned at a respective cutting diameter, wherein the first core diameter is 77-92% of the cutting diameter of the first cutting edges, and wherein the second core diameter is 77-92% of the cutting diameter of the second cutting edges. Even more preferably, the first and second core diameter is within the range of 82-87% of the respective cutting diameter. In other words, the start (front) and end (rear) values of the first core diameter is preferably 82% (80-84%) and 87% (85-89%), respectively, and the start (front) and end (rear) values of the second core diameter is preferably 87% (85-89%) and 82% (80-84%), respectively.

By such a cutting tool, any delamination between honeycomb structure and top or bottom layer is further reduced. By such a cutting tool, the surface quality of the cut honeycomb structure material is further improved.

A cutting diameter can be defined as a diameter of an imaginary cylinder concentric with the longitudinal axis, which wherein the first and second helical cutting edges extend radially up to the side surface of the said imaginary cylinder. Preferably, the third cutting edges extend radially up to the side surface of said imaginary cylinder.

Preferably, the first helical cutting edges are positioned at a cutting diameter, and the second helical cutting edges are positioned at the same cutting diameter as the first named cutting diameter.

According to an embodiment of the invention, the number of first helical flutes is greater than the number of second helical flutes.

By such a cutting tool, machined surface quality and/or tool life and/or noise level is improved. This is due to that harmonics during the cutting process is avoided or reduced, thereby avoiding or reducing the risk for a continuing repeating pattern.

Preferably, the number of first helical flutes is 8-14.

Preferably, the number of second helical flutes is 6-12.

According to an embodiment of the invention, the first and second helical cutting edges are positioned at a constant or substantially constant cutting diameter.

A cutting diameter can be defined as a diameter of an imaginary cylinder concentric with the longitudinal axis, which wherein the first and second helical cutting edges extend radially up to the side surface of the said imaginary cylinder. Preferably, the third cutting edges extend radially up to the side surface of said imaginary cylinder.

By such a cutting tool, a straight wall can be formed during machining. Alternatively, it is possible to create a flat bottom when machining a closed slot on the bottom side.

According to an embodiment of the invention, the first helix angle is decreasing linearly and the second helix angle is increasing linearly.

According to an embodiment of the invention, the front end face surface comprises opposite cutting edges extending in a plane perpendicular to the longitudinal axis.

By such a cutting tool, an internal 90 degree corner may be machined.

According to an embodiment of the invention, the peripheral surface of the cutting tool comprises at least one third flute in the area of the cutting portion. The technical effect with a cutting tool of this kind having one or several third flutes is that more effective evacuation of the material removed from the work piece is achieved. This effect is especially evident when machining honeycomb structure having a filler. A filler is a material that the honeycomb structure is "filled" with. Thanks to the third flute(s), the tool gets easier rid of the dust created by the filler during machining of the honeycomb structure. Thanks to the improved evacuation of the material removed, the cutting date can be increased.

According to an embodiment of the invention, the third flute(s) are intersecting either one of the second helical flutes or one of the first helical flutes or both. In this way, at least one first helical flute and/or at least one second helical flute is interrupted by the third flute creating more space for the material removed and furthermore facilitating the evacuation of the material removed from the work piece.

According to an embodiment of the invention, the third flute(s) is/are helical flute(s) helically aligned about the longitudinal axis. As the first helical flutes and the second helical flutes are helical, it is appropriate to arrange also the third flutes to be helical in order to have a more balanced tool having good dynamic properties at the same time as the performance of the tool with regard to the evacuation of the material removed is improved.

According to an embodiment of the invention, the third flute(s) form(s) a helix angle equal to or substantially equal to one of the first helix angle and the second helix angle. Thanks to this arrangement, even better dynamic properties are achieved at the same time as the performance of the tool with regard to the evacuation of the material removed is improved. A further benefit with this arrangement is that all the cutting edges formed as apexes of pyramid protrusions can be kept as whole pyramid protrusions. Otherwise, there would be cutting edges partly interrupted by the third flute(s) which in its turn might lead to small edge fragments being present on the tool but not being strong enough to stand the cutting forces. Such edge segments might be broken during machining decreasing the quality of the final component.

According to an embodiment of the invention, a third core diameter is defined by a diameter of the third flute and wherein the third core diameter is smaller than one or each of the first core diameter and the second core diameter when all three said core diameters are measured in a plane perpendicular to the longitudinal axis of the cutting tool. This arrangement ensures that the third flute(s) is/are deeper than both or at least one of the first helical flutes and the second helical flutes which in its turn creates space enough for the material removed and the material removed is easier evacuated. It is preferred that the third core diameter is smaller than each of the first core diameter and the second core diameter.

According to an embodiment of the invention, the number of third flutes is smaller than the number of the first helical flutes.

According to an embodiment of the invention, the third flute(s) is/are extending from the front end to a third flute rear end. Thanks to this arrangement it is ensured that the tool has good evacuation of the material removed even if a work piece is machined by a part of the cutting portion close to the front end of the cutting tool.

According to an embodiment of the invention, an axial distance from the front end to the third helical flute rear end is grater than an axial distance from the front end to the first helical flute rear end. Thanks to this arrangement, the entire part of the cutting portion having both the first helical flutes and the second helical flutes can be used for machining with improved evacuation of the material removed. Most preferably but not necessary, the third flute rear end is situated at a larger axial distance from the front end than the second helical flute rear end. Thanks to this arrangement of the tool, any part of the cutting portion can be used and also the entire part of the cutting portion can be used at the same time as good evacuation of the material removed can be obtained.

According to an aspect of the invention, a method to machine a work piece comprising a carbon fiber reinforced polymer, a glass fiber reinforced polymer, an aramid fiber reinforced polymer or a paper honeycomb, comprising the steps of: providing the cutting tool; rotating the cutting tool about the longitudinal axis thereof in a direction of rotation; and cutting the work piece such that the peripheral surface is active axially from a first point to a second point, where the first point is axially between and spaced apart from the front end and the second helical flute front end, and where the second point is axially between and spaced apart from the first helical flute rear end and the second helical flute rear end.

By such a method, delamination between honeycomb structure and top or bottom layer is further reduced.

The work piece is preferably a sandwich-structured material or a sandwich panel. The work piece preferably comprises a honeycomb structured core between a top and a bottom layer.

The method preferably comprises the step of shaping wall surface of a cavity in the work piece. Said cavity is preferably in the form of a through hole opening in opposite top and bottom surfaces. The work piece preferably has a constant thickness.

According to an aspect of the invention, the method to machine a work piece further comprising the steps of: selecting the work piece to comprise a top layer, a bottom layer and a honeycomb structured core between the top and bottom layers; positioning the work piece such that the top and bottom layers extend primarily in parallel planes perpendicular to the longitudinal axis of the cutting tool; positioning the cutting tool such that the honeycomb structured core extend longitudinally from the second helical flute front end to the first helical flute rear end; and simultaneously cutting the top layer solely by the second cutting edges and cutting the bottom layer solely by the first cutting edges.

By such a method, the top layer is cut solely by the second cutting edges, and the bottom layer is cut solely by the first cutting edges, which creates a compression effect which reduces delamination and uncut fibers. The honeycomb structured core is cut solely by the longitudinal portion of the cutting tool where first and second helical flutes intersect. In other words, thus the honeycomb structured core is cut at least partly by the third cutting edges, which give an improved surface finish of said honeycomb structured core.

The expression "positioning the cutting tool such that the honeycomb structured core extend longitudinally from the second helical flute front end (15) to the first helical flute rear end (14)" should be interpreted such that a border between the bottom layer and honeycomb structured core is longitudinally within +/−1.0 mm, more preferably within +/−0.5 mm, from the longitudinal position of the second helical flute front end, and such that a border between the top layer and honeycomb structured core is longitudinally within +/−1.0 mm, more preferably within +/−0.5 mm, from the longitudinal position of the first helical flute rear end. The top and bottom layer, respectively, preferably has a constant or substantially constant thickness.

The top layer is preferably positioned longitudinally entirely at a distance from the second helical flute rear end.

The bottom layer is preferably positioned longitudinally entirely at a distance from the front end.

The top and bottom layers are preferably sheet-like or sheet-shaped layers, each having a thickness which is less than, preferably less than 20%, of the thickness of the intermediate honeycomb structured core. Preferably, the top and bottom layers each have a thickness which is within the range of 0.5-3.0 mm, even more preferably within the range of 0.5-2.0 mm. Preferably, the thickness of the top layer is within the range of +/−20% of the thickness of the bottom layer.

The top and bottom layers are preferably made from AFRP. Each of the top and bottom layers preferably comprises a plurality of unidirectional layers of fibers, where adjacent layers of said layers of fibers extend in directions which are not parallel.

The honeycomb structured core preferably has a constant thickness thereof within the range of 5-20 mm, even more preferably 8-16 mm.

The honeycomb structured core is preferably made from AFRP.

The honeycomb structure is preferably formed by a plurality of hexagonal shaped cells.

According to a further aspect of the invention, a method to manufacture a peripheral surface of the cutting tool comprises the steps of: providing a cutting tool blank having a front end, a rear end and a longitudinal axis; providing one or more grinding wheels; forming a set of first helical flutes by removing material from the cutting tool blank using one of the one or more grinding wheels such that the first helical flutes extend axially between a front end of the cutting tool blank up to a first helical flute rear end, such that the first helical flutes are helically aligned about the longitudinal axis with first helix angle, such that the first helix angle is decreasing in absolute value away from the front end of the cutting tool blank and such that a first core diameter is defined by the first helical flutes; and forming a set of second helical flutes by removing material from the cutting tool blank using one of the one or more grinding wheels such that the second helical flutes extend axially between a second helical flute front end, axially between and spaced apart from the front end of the cutting tool blank and the first helical flute rear end, and a second helical flute rear end, such that the second helical flutes are helically aligned about the longitudinal axis with a second helix angle, such that the second helix angle is increasing in absolute value away from the front end, and such that a second core diameter is defined by the second helical flutes.

The cutting tool blank is preferably cylindrical. The cutting tool blank is preferably made from cemented carbide. The grinding wheel is preferably made from diamond.

The set of first helical flutes may be formed prior to the formation of the set of second helical flutes. Alternatively, the set of second helical flutes may be formed prior to the formation of the set of first helical flutes.

DESCRIPTION OF THE DRAWINGS

The present invention will now be explained in more detail by a description of different embodiments of the invention and by reference to the accompanying drawings.

DETAILED DESCRIPTION OF EMBODIMENTS OF THE INVENTION

Reference is made to FIGS. 5-8, which show a rotatable cutting tool 1 having a longitudinal axis A about which the rotary cutting tool is rotatable in a direction of rotation R.

Figure 5:
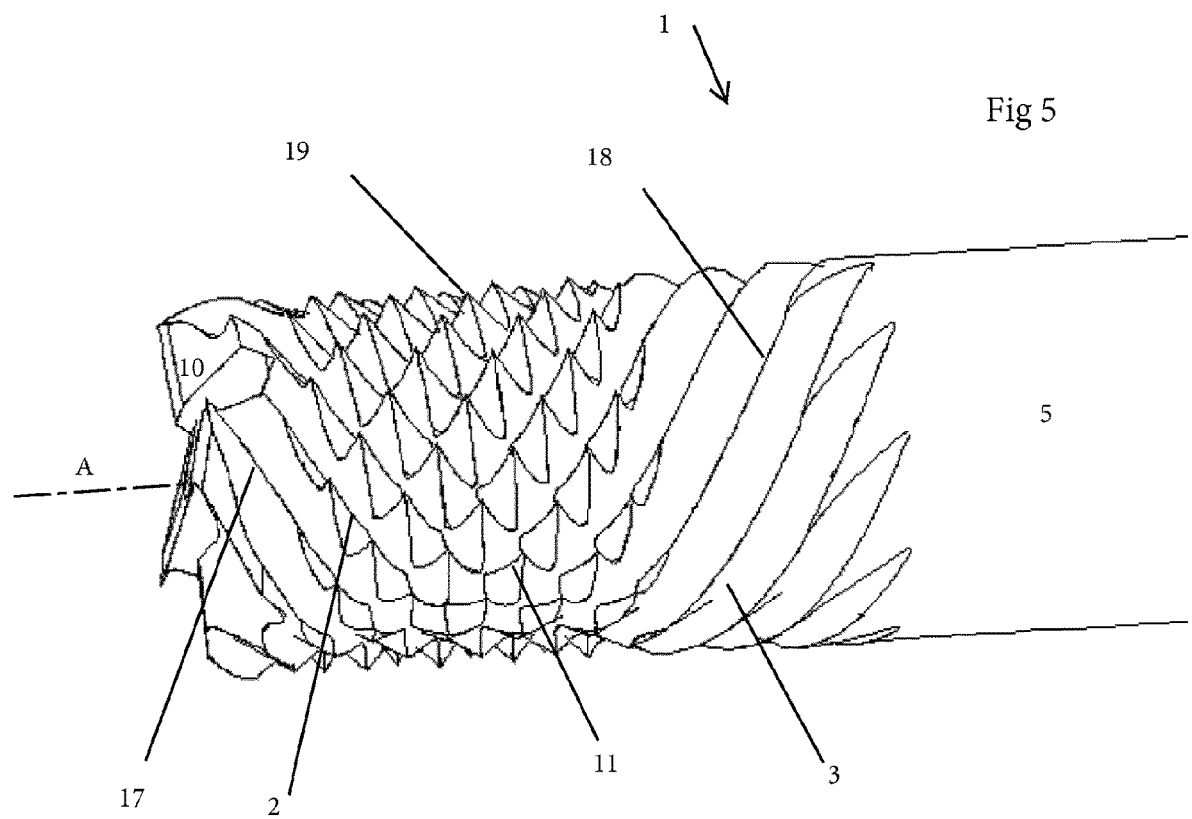
FIG. 5 is a perspective view of a rotatable cutting tool according to a first embodiment.
Figure 7:
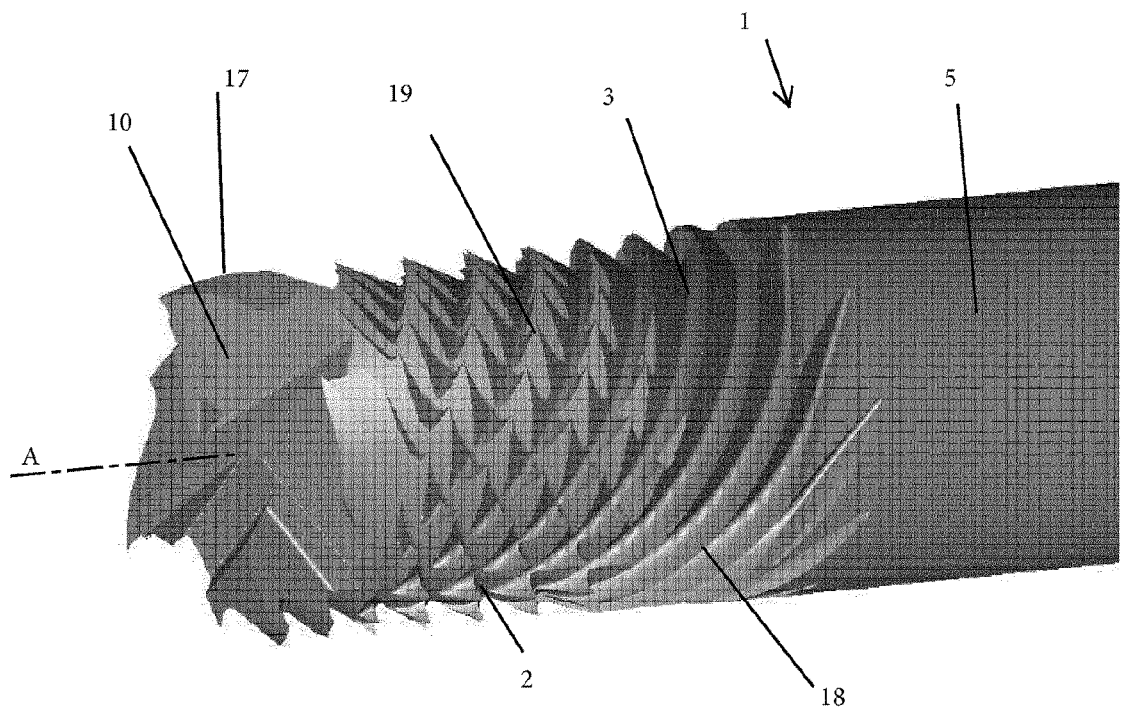
FIG. 7 is a yet a perspective view of the cutting tool in FIG. 5.
Figure 8:
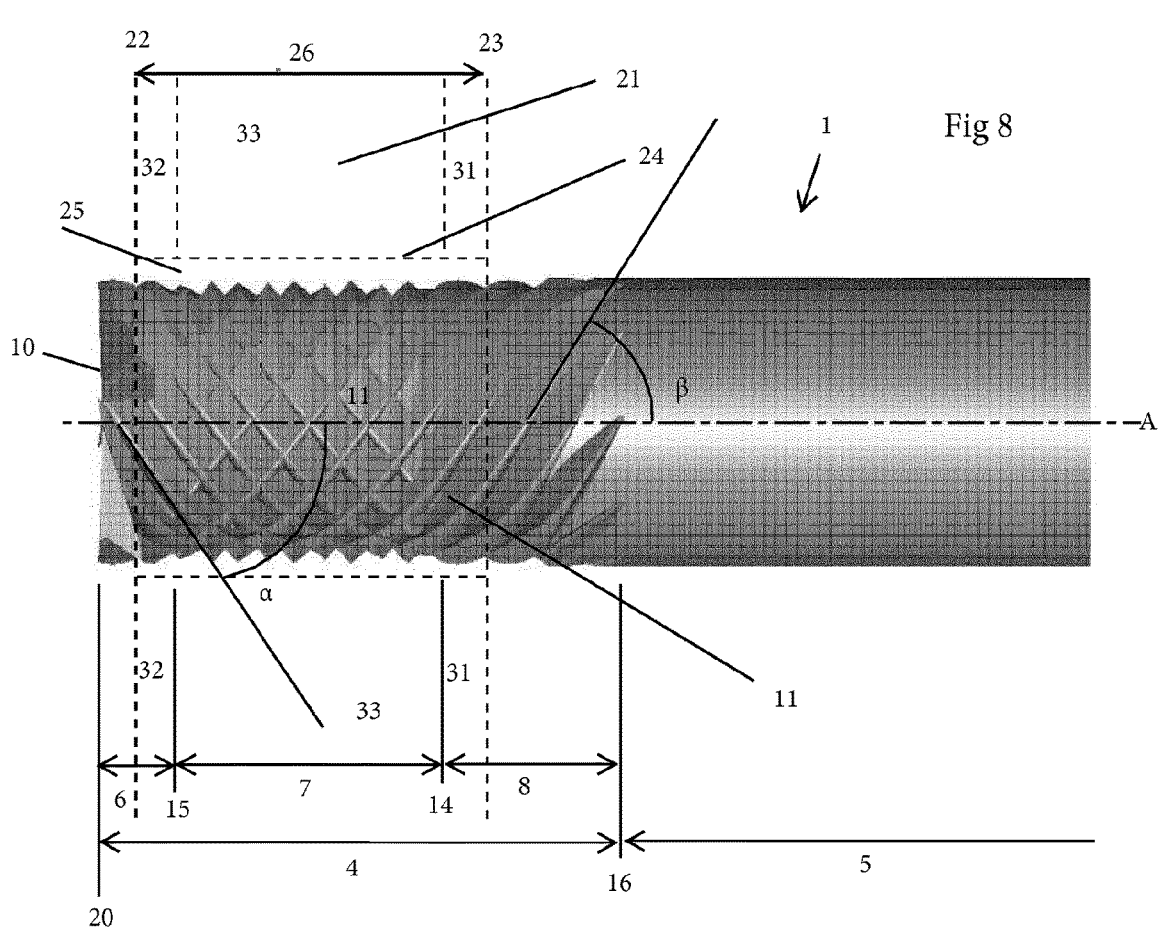
FIG. 8 is a side view of the cutting tool in FIG. 5 and a work piece.

The rotatable cutting tool 1 comprises a front end 20 and an opposite rear end 9. The front end 20 comprises a front end face surface 10. A cutting portion 4 extends from the front end 20. A mounting portion 5 extends from the rear end 9. The cutting portion 4 comprises the front end face surface 10, intersected by the longitudinal axis A, and a peripheral surface 11 extending from the front end face surface 10 towards the mounting portion 5. The peripheral surface 11 comprises first helical flutes 2 extending from the front end 20 to a first helical flute rear end 14. The peripheral surface 11 further comprises second helical flutes 3 extending from a second helical flute front end 15 to a second helical flute rear end 16. The second helical flutes 3 intersects with at the first helical flutes 2 at a portion located between the first helical flute rear end 14 and the second helical flute front end 15. The second helical flute front end 15, the first helical flute rear end 14, and the second helical flute rear end 16 each is at an axial distance greater than zero from the front end 20. As seen in FIGS. 5 and 7, first helical cutting edges 17 are formed between adjacent pairs of first helical flutes 2, second helical cutting edges 18 are formed between adjacent pairs of second helical flutes 3, and third cutting edges 19 are formed between adjacent pairs of first helical flutes 2 and adjacent pairs of second helical flutes 3. As best seen in FIG. 8, the first helical flutes 2 and the second helical flutes 3 being of opposite hands. The first helical flutes 2 are helically aligned about the longitudinal axis A and forming a first helix angle $\alpha$, and the second helical flutes 3 are helically aligned about the longitudinal axis A and forming a second helix angle $\beta$. The first helix angle $\alpha$ is decreasing in absolute value away from the front end 20. The second helix angle $\beta$ is increasing in absolute value away from the front end 20. As best seen in FIG. 7, the third cutting edges 19 comprise cutting edges formed as apexes of pyramid protrusions. As best seen in FIG. 8, cutting edges formed within a third sub portion of the peripheral surface, defined by the axial distance 7, are not all identical. An axial distance 7 between the first helical flute rear end 14 and the second helical flute front end 15 is greater than an axial distance 6 between the front end 20 and the second helical flute front end 15. The axial distance 7 between the first helical flute rear end 14 and the second helical flute front end 15 is greater than an axial distance 8 between the first helical flute rear end 14 and the second helical flute rear end 16. The first helix angle $\alpha$ in absolute value varies within the range of 40°-70°. The second helix angle $\beta$ in absolute value varies within the range of 40°-70°

Figure 6:
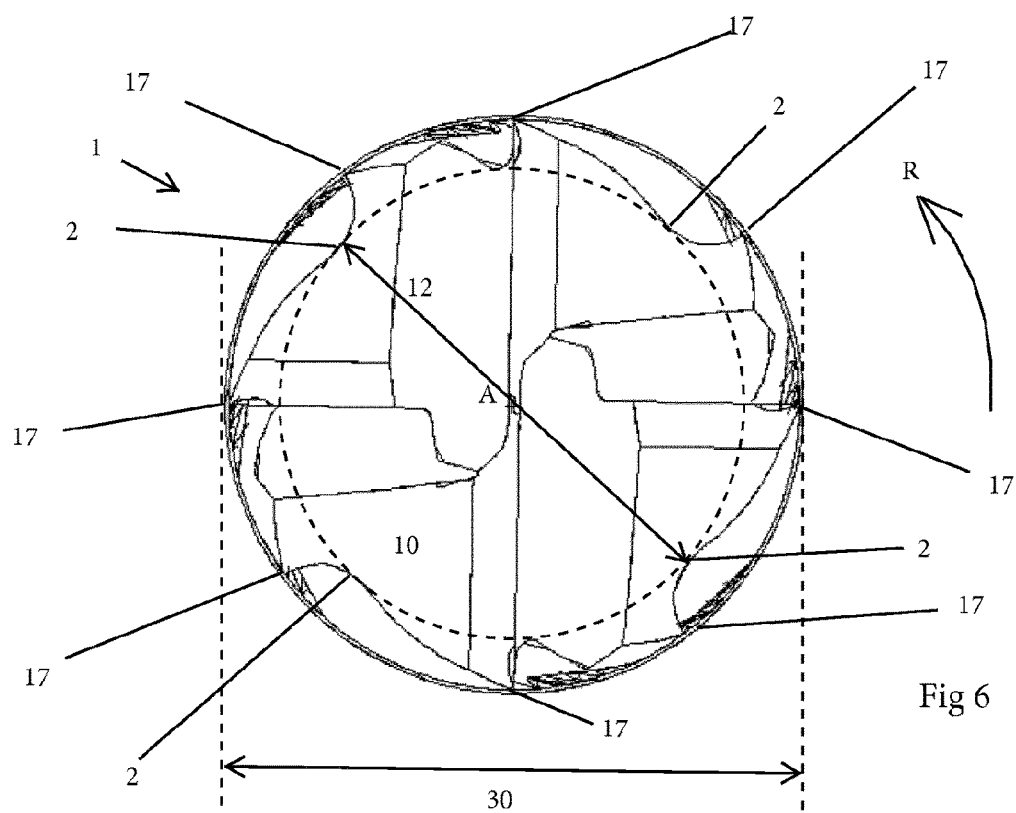
FIG. 6 is a front view of the cutting tool in FIG. 5.

As best seen in FIG. 6, the first helical cutting edges 17 are positioned at cutting diameter 30. The first core diameter 12 is within the range of 77-92% of the cutting diameter 30 of the first cutting edges 17. In FIG. 6, some first helical flutes 2 are obscured by other portions of the cutting tool 1.

The number of first helical flutes 2 is greater than the number of second helical flutes 3. Preferably, the number of first helical flutes is 8-14. Preferably, the number of second helical flutes is 6-12.

In FIG. 8, it is shown a method to machine a work piece 21 comprising a carbon fiber reinforced polymer, a glass fiber reinforced polymer or an aramid fiber reinforced polymer. The work piece 21 comprises a top layer 31, a bottom layer 32 and a honeycomb structured core 33 between the top and bottom layers 31, 32. The work piece 21 thus is a sandwich-structured material or a sandwich panel. The work piece 21 preferably extends mainly in a direction perpendicular to the longitudinal axis A of the cutting tool 1. In other words, the work piece 21 is positioned such that the top and bottom layers 31, 32 extend primarily in parallel planes perpendicular to the longitudinal axis A of the cutting tool 1.

The work piece 21 has a constant thickness 26. A cavity 25 in the form of a through hole opening in opposite surfaces in the top and bottom surfaces 31, 32 is formed in the work piece 21.

During cutting of the work piece 21, a wall surface 24, or a hole surface, of the cavity 25 is formed. Alternatively, a peripheral surface of the work piece is formed (not shown). In either case, the surface formed extend parallel to the longitudinal axis A of the cutting tool 1 in a cross section, as shown in FIG. 8. During cutting of the work piece 21, the cutting tool 1 is rotating about the longitudinal axis A thereof, such that the peripheral surface 11 is active, i.e. cutting, axially from a first point 22 to a second point 23, where the first point 22 is axially between and spaced apart from the front end 20 and the second helical flute front end 15, and where the second point 23 is axially between and spaced apart from the first helical flute rear end 14 and the second helical flute rear end 16. The thickness 26 of the work piece 21 corresponds to the distance between said first and second points 22, 23.

The cutting tool 1 is during cutting positioned such that the honeycomb structured core 33 extend longitudinally from the second helical flute front end 15 to the first helical flute rear end 14.

During cutting, the top layer 31 is cut solely by the second cutting edges 18 and the bottom layer 32 is cut solely by the first cutting edges 17. This creates an improved compression effect which reduces delamination and uncut fibers.

The honeycomb structured core 33 is cut solely by the longitudinal portion of the cutting tool 1 where first and second helical flutes 2, 3 intersect. In other words, thus the honeycomb structured core 33 is cut at least partly by the third cutting edges 19, which give an improved, e.g. smooth, surface finish of said honeycomb structured core 33.

In other words, the peripheral surface 11 of the cutting portion 4 comprises three sub-portions: a first sub portion, defined by the axial distance 6, comprising only first helical flutes, i.e. not comprising second helical flutes; a second sub portion, defined by the axial distance 8, comprising only second helical flutes, i.e. not comprising first helical flutes; and a third sub portion, defined by the axial distance 7 and located between said first and second sub portions, comprising first and second helical flutes. The third sub portion comprises intersections of first and second helical flutes, and the third sub portion cut the honeycomb structured core 33.

The top layer 31 is positioned longitudinally entirely at a distance from, i.e. forward from, the second helical flute rear end 16. The bottom layer 32 is positioned longitudinally entirely at a distance from, i.e. rearward of, the front end 20.

Figure 1:
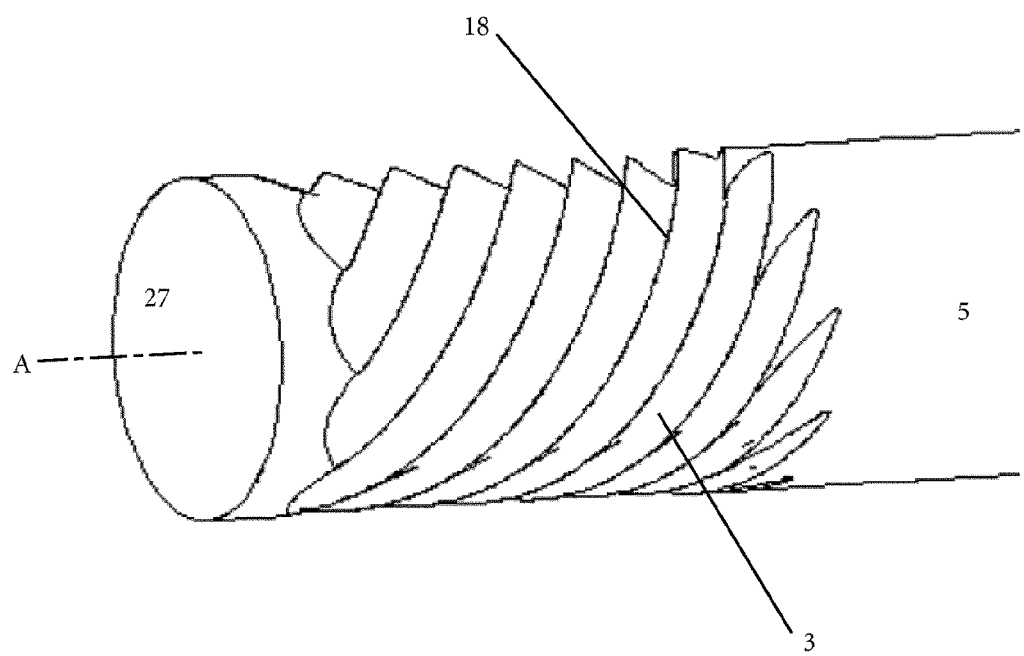
FIG. 1 is a perspective view of a cutting tool blank comprising a set of second helical flutes.
Figure 2:
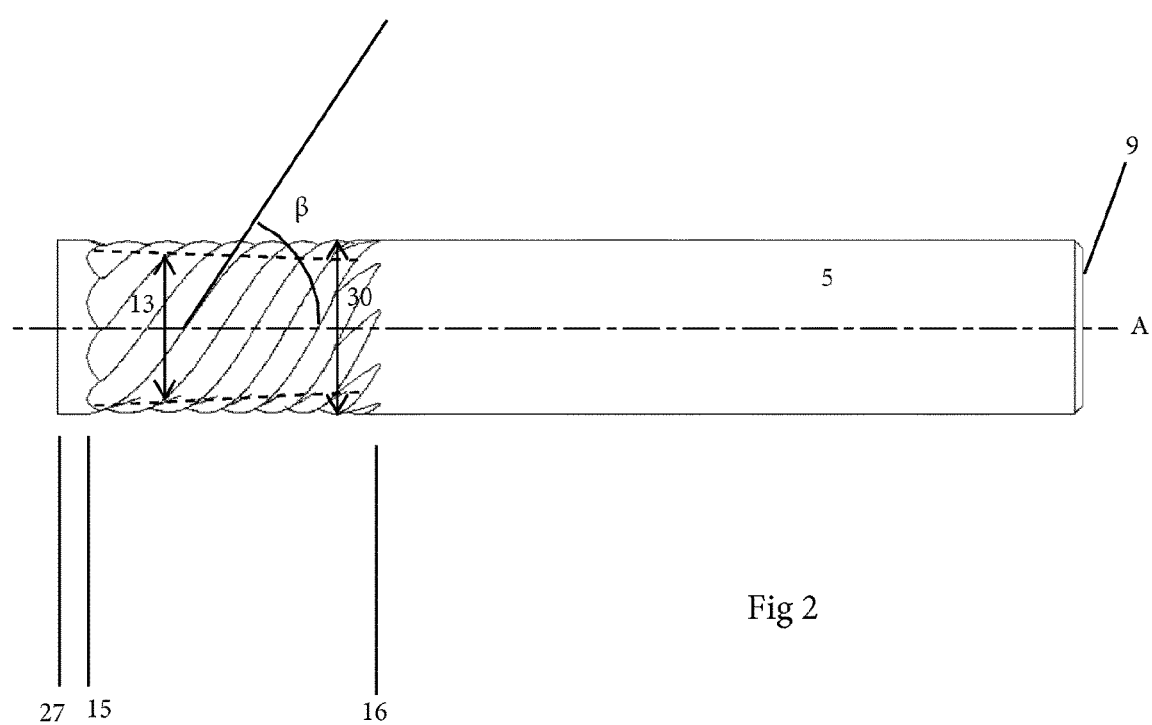
FIG. 2 is a side view of the cutting tool blank in in FIG. 1.

Reference is now made to FIGS. 1 and 2, which show a cylindrical cutting tool blank, made from cemented carbide. The cutting tool blank comprises a front end 27, a rear end 9 and a longitudinal axis A intersecting the front and rear ends 9, 27. Second helical flutes 3 and second helical cutting edges 18 have been formed in the peripheral surface of the cutting tool blank by a grinding operation, using one or more grinding wheels (not shown). The second helical flutes 3 extend axially between a second helical flute front end 15, axially between and spaced apart from the front end 27 of the cutting tool blank and the first helical flute rear end 14 (shown in e.g. FIG. 4), and a second helical flute rear end 16, such that the second helical flutes 3 are helically aligned about the longitudinal axis A with a second helix angle $\beta$. The second helix angle $\beta$ is increasing in absolute value away from the front end 27. A second core diameter 13 is defined by the second helical flutes 3. The second helical cutting edges 17, 18 are positioned at a constant cutting diameter 30. The second core diameter 13 is 77-92% of the cutting diameter 30 of the second cutting edges 18. The second core diameter 13 is decreasing away from the front end 20.

Figure 3:
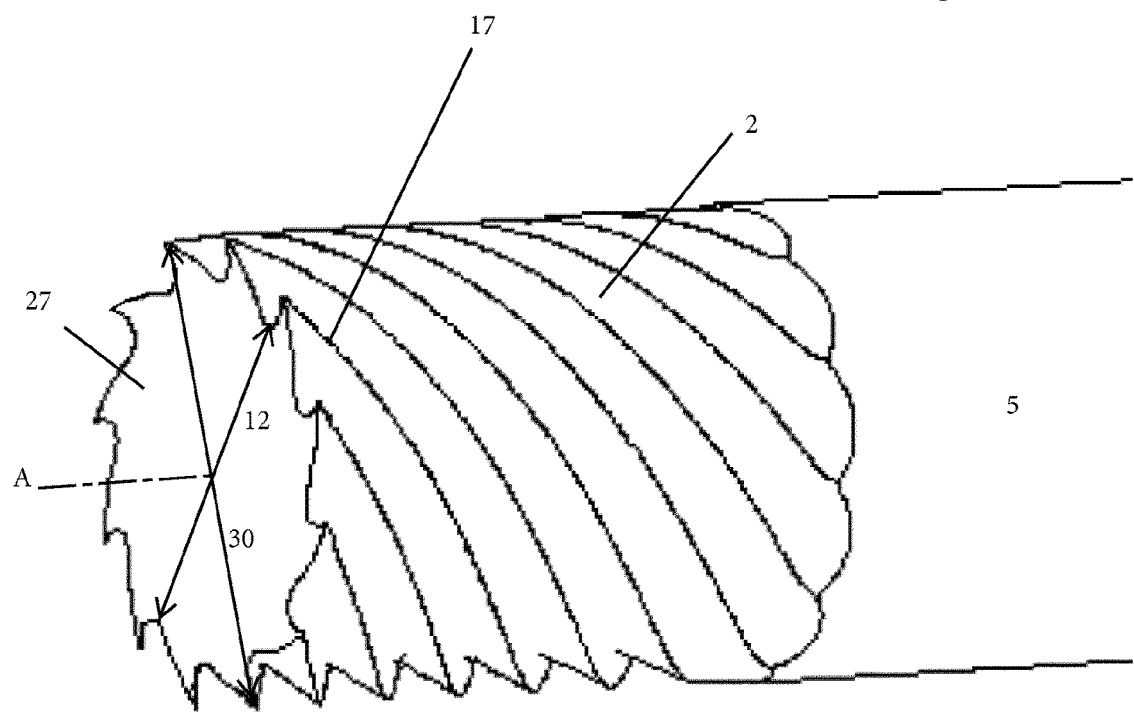
FIG. 3 is a perspective view of a cutting tool blank comprising a set of first helical flutes.
Figure 4:
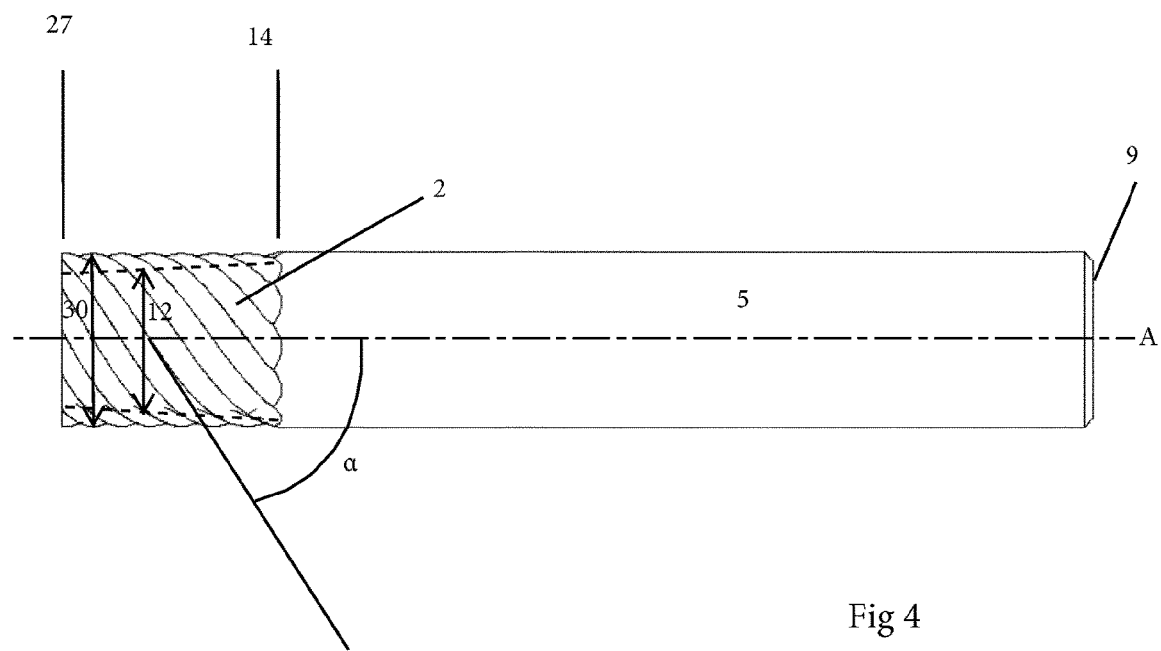
FIG. 4 is a side view of the cutting tool blank in in FIG. 3.

Reference is now made to FIGS. 3 and 4, which show a cylindrical cutting tool blank, made from cemented carbide. The cutting tool blank comprises a front end 27, a rear end 9 and a longitudinal axis A intersecting the front and rear ends 9, 27. First helical flutes 2 and first helical gutting edges 17 have been formed in the peripheral surface of the cutting tool blank by a grinding operation, using one or more grinding wheels (not shown). The first helical flutes 2 extend axially between the front end 27 and the first helical flute rear end 14, such that the first helical flutes 2 are helically aligned about the longitudinal axis A with a first helix angle α. The first helix angle α is decreasing in absolute value away from the front end 27. As best seen in FIG. 3, a first core diameter 12 is defined by the first helical flutes 2, or more precisely, by the diameter which bottom portions or radially inner portions of the first helical flutes are positioned in a cross section perpendicular to the longitudinal axis A. For clarification, the definition of the second core diameter is defined in a corresponding manner. The first helical cutting edges 17 are positioned at a constant cutting diameter 30. The first core diameter 12 is 77-92% of the cutting diameter 30 of the second cutting edges 18. The first core diameter 12 is increasing away from the front end 27.

When manufacturing the cutting tool 1, the first helical flutes 2 may be formed by a grinding operation which is prior to the grinding of the second helical flutes 3. Alternatively, the reverse order is possible. In either case, said grinding operations jointly form the peripheral surface 11 of the cutting portion 4 of the rotatable cutting tool 1. In either case, the peripheral surface 11 of the cutting portion 4 of the rotatable cutting tool 1 will comprise three sub-portions: a first sub portion comprising only first helical flutes, i.e. not comprising second helical flutes; a second sub portion comprising only second helical flutes, i.e. not comprising first helical flutes; and a third sub portion, located between said first and second sub portions, comprising intersecting first and second helical flutes. The core diameter along the third sub portion is defined as the smallest of the first and second core diameter 12, 13 in each cross section perpendicular to the longitudinal axis A. Preferably, the core diameter along the third sub portion is increasing from both the first helical flute rear end 14 and the second helical flute front ends 16, thereby having a highest value there between.

When comparing the cutting tool blank and the rotatable cutting tool 1, the following features correspond: the first and second helical cutting edges 17, 18, the first and second helical flutes 2, 3, the first and second core diameters 12, 13, the cutting diameter 30, the first helical flute rear end 14, the second helical flute front and rear ends 15, 16.

It is possible that the front end 27 of the cutting tool blank may correspond to the front end 20 of the cutting tool. Preferably though, a still further grinding operation is made such that cutting edges are formed in the front end 27 of the cutting tool blank. Such a cutting tool 1 is shown in the embodiment shown in FIGS. 5-8. As best seen in FIG. 6, the front end of the cutting tool 1 comprises a front end face surface 10 which is part of the cutting portion of the cutting tool. At least some of the first helical flutes 2 and the first cutting edges 17 intersect or is adjacent to the front end face surface 10. The front end face surface 10 preferably, as seen in e.g. FIG. 6, comprises two opposite cutting edges extending radially from the cutting diameter 30. Said two opposite cutting edges preferably meet or intersect at the longitudinal axis A. Said two opposite cutting edges preferably extend in a plane perpendicular to the longitudinal axis A. Thereby, the rotatable cutting tool can be used to cut an internal 90 degree corner.

Figure 9:
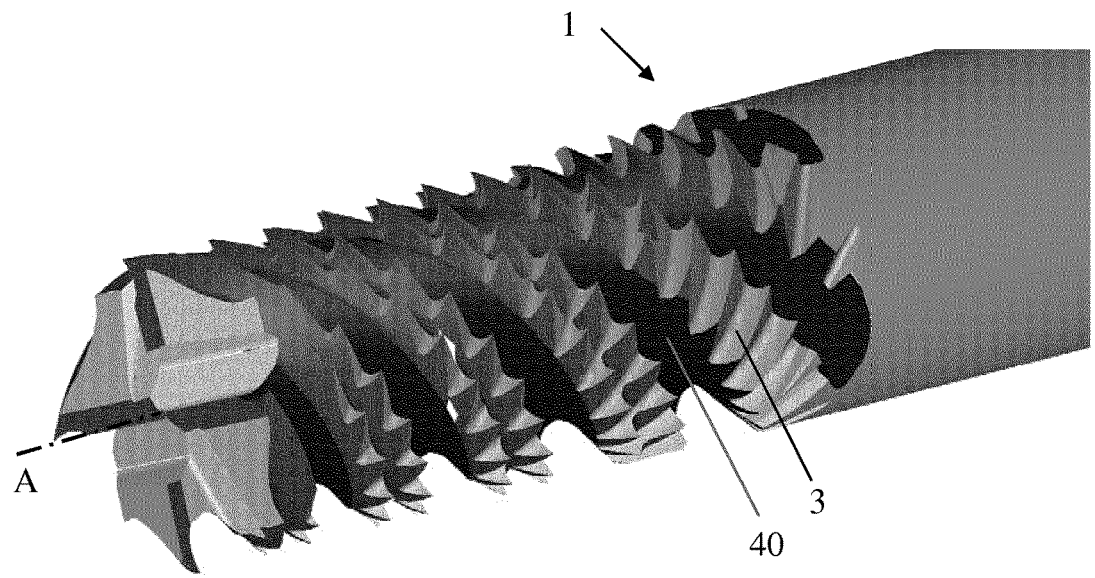
FIG. 9 is a perspective view of a rotatable cutting tool according to another embodiment.
Figure 10:
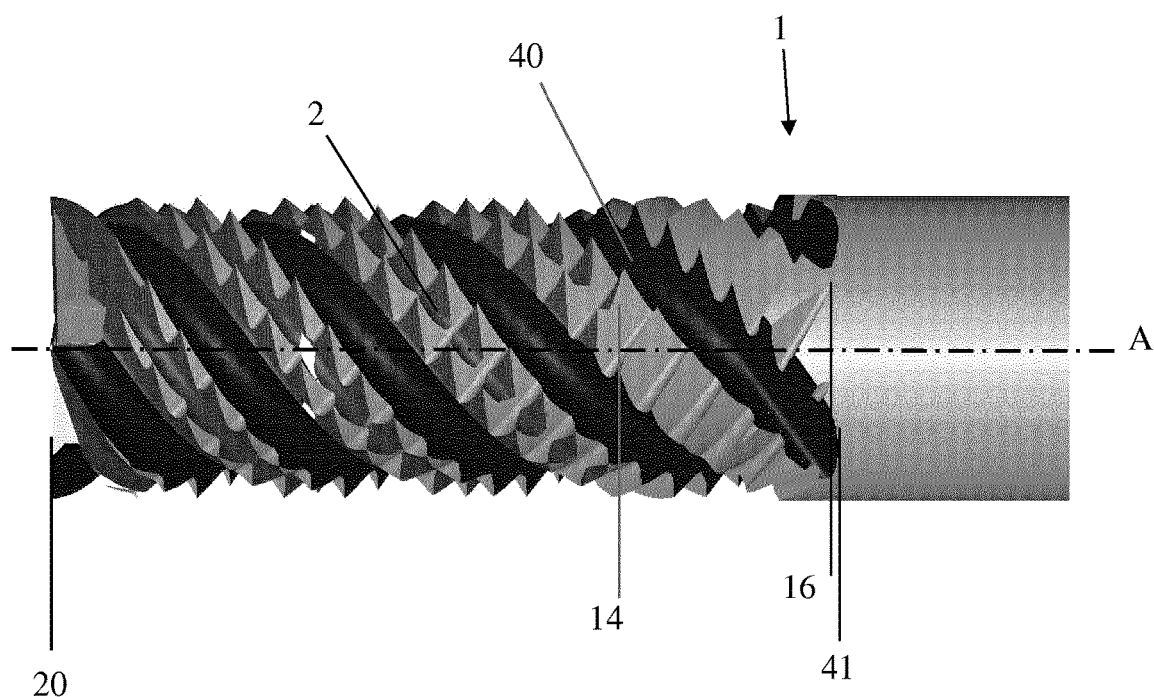
FIG. 10 is a side view of the cutting tool in FIG. 9.

Reference is now made to FIGS. 9 and 10, which show a cutting tool 1 of the same kind as earlier described but which furthermore comprises third flutes 40 arranged in the peripheral surface 11. The flutes 40 are helical flutes forming a third helix angle, they have a third core diameter and they are extending from the front end 20 to the third flute rear end 41. The third helix angle is equal to the first helix angle α and the third flutes 40 are formed between adjacent pairs of the first helical flutes 2. The third core diameter is defined as the distance between opposite third flutes 40 measured in a plane perpendicular to the longitudinal axis of the cutting tool. In other words, the third core diameter is twice the shortest distance between the center axis A and a third flute 40 measured in a plane perpendicular to the longitudinal axis A. The third core diameter is smaller than each of the first core diameter 12 and the second core diameter 13 when said core diameters are measured in a plane perpendicular to the longitudinal axis A. The third flutes 40 does not need to extend from the front end 20. It is enough that the third flute or flutes intersect at least one of the second helical flutes 3 to achieve the desired effect. In this embodiment, the third flutes 40 are formed in the same hand as the first helical flutes 2 and they are also in parallel with the first helical flutes 2. However, the third flutes 40 do not need to be helically formed. They can be also straight and formed in parallel with the longitudinal axis A or build an angle with the longitudinal axis. The third core diameter can vary along the cutting portion 4. It can also vary such that it has a minimum value at a position which is axially in the middle of the cutting portion 4 and the value of its diameter is increasing toward the ends of the cutting portion.

As it can be seen in FIGS. 9 and 10, a third flute is arranged between adjacent pairs of the first helical flutes 2. The number of third helical flutes is smaller than the number of first helical flutes or more precisely, the number of third helical flutes is half the number of first helical flutes. Accordingly, it is preferable that the number of first helical flutes 2 is a multiple of the number of the third flutes 40.

Similar to the tool in FIGS. 9 and 10, the third flutes 40 can be arranged in the same hand as the second helical flutes 3. They can also run in parallel with the second helical flutes 3 and everything said regarding the arrangement and the properties of the embodiments where the third flutes 40 are arranged in the same hand as the first helical flutes 2, applies also to the embodiments of the tool where the third flutes 40 are arranged in the same hand as the second helical flutes 3.

The technical effect with a cutting tool of this kind having one or several third flutes 40 is especially evident when machining honeycomb structure having a filler. A filler is a material that the honeycomb structure is "filled" with. Thanks to the third flute(s) 40, the tool gets easier rid of the dust created by the filler during machining of the honeycomb structure.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person. Terms such as "axial" or "longitudinal" refer to directions or distances along or parallel to the longitudinal axis of the cutting tool.

The invention claimed is:

1. A rotatable cutting tool having a longitudinal axis about which the rotary cutting tool is rotatable in a direction of rotation, the rotatable cutting tool comprising:
a front end and an opposite rear end, the front end having a front end face surface; and
a cutting portion extending from the front end and a mounting portion extending from the rear end, the cutting portion including the front end face surface, intersected by the longitudinal axis, and a peripheral surface extending from the front end face surface towards the mounting portion, the peripheral surface including first helical flutes extending from the front end to a first helical flute rear end, second helical flutes extending from a second helical flute front end to a second helical flute rear end, wherein at least one of the second helical flutes intersects with at least one of the first helical flutes at a portion located between the first helical flute rear end and the second helical flute front end, the second helical flute front end, the first helical flute rear end, and the second helical flute rear end each being at an axial distance greater than zero from the front end, wherein first helical cutting edges are formed between adjacent pairs of first helical flutes, wherein second helical cutting edges are formed between adjacent pairs of second helical flutes, wherein third cutting edges are formed between adjacent pairs of first helical flutes and adjacent pairs of second helical flutes, wherein the first helical flutes and the second helical flutes being of opposite hands, wherein the first helical flutes are helically aligned about the longitudinal axis and forming a first helix angle, wherein the second helical flutes are helically aligned about the longitudinal axis and forming a second helix angle, wherein a first core diameter is defined by a diameter of the first helical flutes, and wherein a second core diameter is defined by a diameter of the second helical flutes, the first helix angle decreasing in absolute value away from the front end and the second helix angle increasing in absolute value away from the front end.

2. The cutting tool according to claim 1, wherein the first core diameter increases along a direction going away from the front end.

3. The cutting tool according to claim 1, wherein the second core diameter decreases along a direction going away from the front end.

4. The cutting tool according to claim 1, wherein the third cutting edges are formed as apexes of pyramid protrusions.

5. The cutting tool according to claim 1, wherein an axial distance between the first helical flute rear end and the second helical flute front end is greater than an axial distance between the front end and the second helical flute front end, and wherein said axial distance between the first helical flute rear end and the second helical flute front end is greater than an axial distance between the first helical flute rear end and the second helical flute rear end.

6. The cutting tool according to claim 1, wherein the first helix angle in absolute value varies within the range of 40°-70°.

7. The cutting tool according to claim 1, wherein the second helix angle in absolute value varies within the range of 40°-70°.

8. The cutting tool according to claim 1, wherein each of the first and second helical cutting edges is positioned at a respective cutting diameter, wherein the first core diameter is 77-92% of the cutting diameter of the first cutting edges, and wherein the second core diameter is 77-92% of the cutting diameter of the second cutting edges.

9. The cutting tool according to claim 1, wherein the number of first helical flutes is greater than the number of second helical flutes.

10. The cutting tool according to claim 1, wherein the first and second helical cutting edges are positioned at a constant or substantially constant cutting diameter.

11. The cutting tool according to claim 1, wherein the front end face surface includes opposite cutting edges extending in a plane perpendicular to the longitudinal axis.

12. The cutting tool according to claim 1, wherein the peripheral surface includes at least one third flute in an area of the cutting portion.

13. The cutting tool according to claim 12, wherein the at least one third flute intersects at least one of the second helical flutes or wherein the at least one third flute intersects at least one of the first helical flutes.

14. The cutting tool according to claim 12, wherein the at least one third flute is a helical flute helically aligned about the longitudinal axis.

15. The cutting tool according to claim 14, wherein the at least one third flute forms a helix angle equal to or substantially equal to one of the first helix angle and the second helix angle.

16. The cutting tool according to claim 14, wherein the at least one third flute is formed between adjacent pairs of first helical flutes or wherein the at least one third flute is formed between adjacent pairs of second helical flutes.

17. The cutting tool according to claim 12, wherein a third core diameter is defined by a diameter of the at least one third flute and wherein the third core diameter is smaller than each of the first core diameter and the second core diameter when said first and second core diameters and the third core diameter are each measured in a same plane perpendicular to the longitudinal axis of the cutting tool.

18. The cutting tool according to claim 12, comprising a plurality of third flutes, wherein a number of third flutes is smaller than a number of first helical flutes.

19. The cutting tool according to claim 12, wherein the at least one third flute extends from the front end to a third flute rear end.

20. The cutting tool according to claim 19, wherein an axial distance from the front end to the third helical flute rear end is greater than an axial distance from the front end to the first helical flute rear end.

21. A method to machine a work piece comprising a carbon fiber reinforced polymer, a glass fiber reinforced polymer, an aramid fiber reinforced polymer or a paper honeycomb, the method comprising the steps of:
providing the cutting tool according to claim 1;
rotating the cutting tool about the longitudinal axis thereof in the direction of rotation; and
cutting the work piece such that the peripheral surface is active axially from a first point to a second point, where the first point is axially between and spaced apart from the front end and the second helical flute front end, and where the second point is axially between and spaced apart from the first helical flute rear end and the second helical flute rear end.

22. The method according to claim 21, further comprising the steps of:
- selecting the work piece to include a top layer, a bottom layer and a honeycomb structured core between the top and bottom layers;
- positioning the work piece such that the top and bottom layers extend primarily in parallel planes perpendicular to the longitudinal axis of the cutting tool;
- positioning the cutting tool such that the honeycomb structured core extend longitudinally from the second helical flute front end to the first helical flute rear end; and
- simultaneously cutting the top layer solely by the second cutting edges and cutting the bottom layer solely by the first cutting edges.

* * * * *